US006799698B2

(12) United States Patent
Ono et al.

(10) Patent No.: US 6,799,698 B2
(45) Date of Patent: Oct. 5, 2004

(54) LIQUID MATERIAL SUPPLY SYSTEM

(75) Inventors: Sumio Ono, Hyogo (JP); Hisatoshi Izumi, Hyogo (JP); Satoru Kurahashi, Hyogo (JP); Yoshihiro Sugino, Hyogo (JP); Nobuhisa Suhara, Hyogo (JP)

(73) Assignee: Heishin Sobi Kabushiki Kaisha, Hyogo-Pref. (JP)

( * ) Notice: Subject to any disclaimer, the term of this patent is extended or adjusted under 35 U.S.C. 154(b) by 0 days.

(21) Appl. No.: 10/694,608

(22) Filed: Oct. 27, 2003

(65) Prior Publication Data

US 2004/0164091 A1 Aug. 26, 2004

(30) Foreign Application Priority Data

Feb. 21, 2003 (JP) ....................................... 2003-043955

(51) Int. Cl.[7] ................................................. G01F 11/00
(52) U.S. Cl. ......................................... 222/55; 222/386
(58) Field of Search ............................. 222/52, 55, 386

(56) References Cited

U.S. PATENT DOCUMENTS 5,199,607 A * 4/1993 Shimano ...................... 222/55
5,277,333 A * 1/1994 Shimano ...................... 222/55
5,487,346 A * 1/1996 Taylor ......................... 222/61
5,992,686 A * 11/1999 Cline et al. .................... 222/55
6,431,096 B1 * 8/2002 Engelke et al. ............... 222/61

FOREIGN PATENT DOCUMENTS

JP 2002-316081 P1 10/2002

* cited by examiner

*Primary Examiner*—Kenneth Bomberg
(74) *Attorney, Agent, or Firm*—Marshall, Gerstein & Borun LLP

(57) ABSTRACT

A liquid material supply system includes a plunger pump, a flow regulating valve, an air-operated valve, a spring type accumulator and a dispenser. The plunger pump is connected to the flow regulating valve by a primary supply line. The flow regulating valve is connected to the dispenser by a secondary supply line. The on-off valve is connected to the secondary supply line. The accumulator is connected to the secondary supply line between the on-off valve and the dispenser. A pressure sensor detects the pressure substantially at the inlet port of the dispenser. This pressure is the basis for controlling the operation of the air-operated valve through an electromagnetic valve. The second chamber of the accumulator can store part of the liquid material supplied through the secondary supply line. The second chamber varies in volume with the balance between the force of the accumulator spring and the pressure in the secondary supply line so as to relax the pressure fluctuation in this line.

1 Claim, 3 Drawing Sheets

LIQUID MATERIAL SUPPLY SYSTEM

BACKGROUND OF THE INVENTION

1. Field of the Invention

The present invention relates to a liquid material supply system, which may be used in a car assembly plant to coat automotive components or works with a constant amount of a sealing compound or other liquid material, or to fill them with a constant amount of an adhesive, grease or other liquid material.

2. Description of Related Art

Generally, in a car assembly plant, a plunger pump, which is a high pressure pump, sucks a sealing compound, an adhesive or other liquid material from a storage tank and supplies it through supply lines to dispensers, each of which is connected to one of the lines. The dispensers coat or fill works with the liquid material. In such a system, a plunger pump or another high pressure pump is used to supply liquid material to one or more distant places.

FIG. 3 of the accompanying drawings shows a conventional system for supplying a sealing compound to distant dispensers 103, one of which is shown, for coating works with the compound. This system includes a storage tank 108, which is connected to a plunger pump 101. The pump 101 is connected through supply lines 102, one of which is shown, to dispensers 103, one of which is shown, each connected to one of the lines 102.

Each supply line 102 is fitted with a flow regulating valve 104 as a pressure reducing valve. The supply line 102 consists of a primary supply line 102', which is high in pressure, on the upstream side of the pressure reducing valve 104 and a secondary supply line 102", which is low in pressure, on the downstream side of this valve 104. The pressure in the primary supply line 102' is kept at a high value of about 15 MPa (150 kg/cm$^2$). The secondary supply line 102" is fitted with an air-operated valve 105 as an on-off valve.

The plunger pump 101 sucks the sealing compound from the storage tank 108 and supplies it under high pressure to the supply lines 102, from which it is supplied to the respective dispensers 103. The dispensers 103 discharge the sealing compound directly onto works so as to coat or fill them with a constant amount of sealing compound.

The flow regulating valve 104 reduces the pressure in the secondary supply line 102", which is the proper supply pressure for the associated dispenser 103, to a value lower than that in the primary supply line 102' for the following reason.

Because the dispenser 103 is mounted on a robot (not shown) or the like, it is preferable that the dispenser 103 be small in size, light in weight and able to discharge a constant amount of liquid material. The dispenser 103 may be a small-capacity single-shaft eccentric screw pump. It is necessary that the discharge pressure of the dispenser 103 be very lower than that of the high pressure pump 108. In other words, there is an upper limit to the supply pressure for the dispenser 103.

The dispenser 103 is fitted with a pressure sensor 106 near its inlet port 103*a*. The sensor 106 detects the pressure substantially at the port 103*a* and outputs a pressure signal to an electromagnetic valve 107, which is an on-off valve. This valve 107 controls the switching operation of the air-operated valve 105 depending on the pressure substantially at the dispenser port 103*a*. The air-operated valve 105 is closed if this pressure, which is the value detected by the sensor 106, is higher than a set upper limit, which may be 0.7 MPa. This valve 105 is opened if the pressure is lower than a set lower limit, which may be 0.3 MPa.

The dispenser 103 intermittently discharges liquid material. In order for the dispenser 103 to discharge a sufficient amount of liquid material every time it starts to discharge liquid material, it is necessary that the pressure in the secondary supply line 102" be kept high to some extent.

Therefore, as soon as the dispenser 103 stops discharging liquid material, the pressure in the secondary supply line 102" rises. When this pressure exceeds the set upper limit, the air-operated valve 105 is closed. Thereafter, as soon as the dispenser 103 starts discharging liquid material, the pressure in the secondary supply line 102" falls. When this pressure falls below the set lower limit, the air-operated valve 105 is opened. Thus, every time the dispenser 103 starts and stops discharging liquid material, the pressure in the secondary supply line 102" falls below the lower limit and rises above the upper limit. As a result, the air-operated valve 105 frequently closes and opens. This may shorten the life of the air-operated valve 105.

The applicant's Japanese patent laid-open publication No. 2002-316081 discloses a liquid material supply system including a supply device and a dispenser, which is connected to the supply device by a supply line. The supply line is fitted with a pressure reducing valve, an on-off valve and a buffer pump, which is a single-shaft eccentric screw pump. The pressure reducing valve is interposed between the supply device and the on-off valve. The screw pump is interposed between the on-off valve and the dispenser. The operation of the buffer pump and the on-off valve is controlled, based on the pressure in the supply line between this pump and the dispenser. The use of the buffer pump makes the pressure reducing valve achieve a larger pressure reduction than in the system shown in FIG. 3. This reduces the pressure acting on the dispenser, and prevents liquid from dripping when the dispenser stops and reverses.

As is the case with the system shown in FIG. 3, the on-off valve of the system disclosed in the Japanese publication frequently closes and opens. This may shorten the life of the on-off valve.

SUMMARY OF THE INVENTION

In view of the foregoing, the object of the present invention is to provide a liquid material supply system having an on-off valve the life of which is lengthened simply at low cost.

A liquid material supply system according to the present invention includes a supply device, a pressure reducing valve and a discharger. The supply device sucks liquid material from a storage tank or another reservoir, and supplies the sucked material under high pressure. The pressure reducing valve has a pressure reduction ratio that can be set. The discharger discharges a constant amount of liquid material to a work. The outlet port of the supply device is connected to the pressure reducing valve by a primary supply line. The pressure reducing valve is connected to the inlet of the discharger by a secondary supply line. The secondary supply line is fitted with an on-off valve, to which a controller is connected. The supply system also includes a pressure sensor for detecting the pressure substantially at the inlet port of the discharger and outputting a pressure signal to the controller. If the detected pressure exceeds a set upper limit, the controller closes the on-off valve. If the detected pressure falls below a set lower limit, the controller opens the on-off valve. The secondary supply line is also fitted with an accumulator between the on-off valve and the inlet port of the discharger. The accumulator prevents the pressure substantially at the inlet port of the discharger from exceeding the upper limit and falling below the lower limit in a short time with the pressure reduction ratio so set that the pressure is lower than for the full flow through the secondary supply line while the discharger is operating.

The life of the on-off valve becomes shorter as the opening and closing frequency of this valve goes up. The frequency is decreased greatly by the combination of the pressure reducing valve, the pressure reduction ratio of which can be set, and the accumulator.

The internal volume of the accumulator decreases if the pressure in the secondary supply line falls while the discharger is discharging liquid material, with the pressure reduction ratio so set that the pressure is lower than for the fill flow through this line while the discharger is operating. This prevents the pressure in the secondary supply line from falling below the set lower limit. Thus, the accumulator compensates for the shortage of the liquid material supplied to the discharger.

When the discharger stops discharging liquid material, the internal volume of the accumulator increases so as to absorb the rise of the pressure in the secondary supply line, preventing this pressure from exceeding the set upper limit.

Thus, the combination of the pressure reducing valve of which the pressure reduction ratio is suitably set and the accumulator almost prevents the pressure in the secondary supply line from exceeding the set upper limit and falling below the set lower limit. Accordingly, the opening and closing frequency of the on-off valve decreases greatly in comparison with that in the conventional system. This lengthens the life of the on-off valve.

More specifically, if it is possible to suitably set the pressure reduction ratio of the pressure reducing valve so as to adjust the average flow within a certain fixed time, depending on the cycles of discharge and stopping of the discharger, the on-off valve will theoretically be kept open. Therefore, if the flow through the secondary supply line is slightly more than the average flow for safety, the opening and closing frequency of the on-off valve greatly decreases, and the material supply is prevented from being short.

The accumulator varies the supply pressure for the discharger, but does not affect the discharge operation of the discharger because the discharger can supply a work with a constant amount of liquid material.

BRIEF DESCRIPTION OF THE DRAWINGS

A preferred embodiment of the present invention is described below in detail with reference to the accompanying drawings, in which.

DETAILED DESCRIPTION OF A PREFERRED EMBODIMENT

Figure 1:
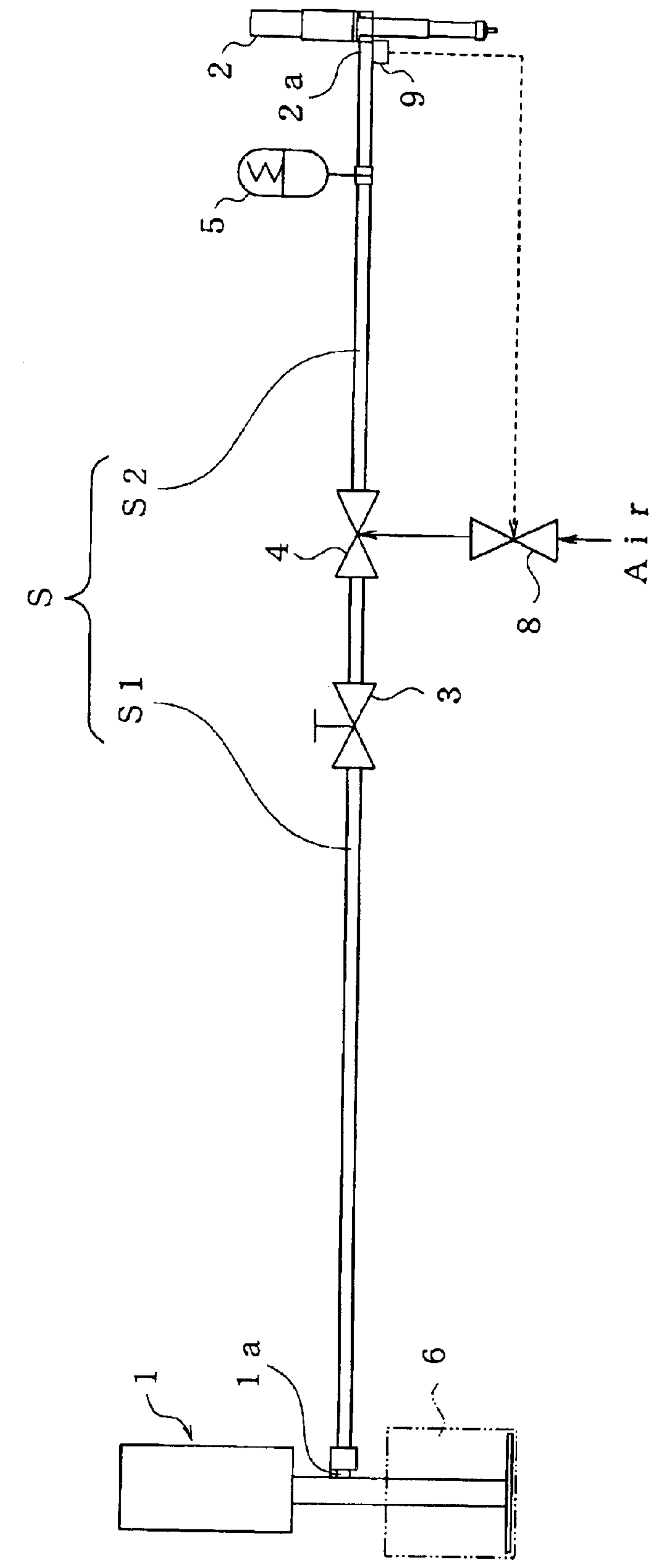
FIG. 1 is a schematic diagram of a liquid material supply system embodying the present invention.

FIG. 1 shows a liquid material supply system embodying the present invention. This system may be used to apply a sealing compound or coating in a car production plant.

As shown in FIG. 1, the liquid material supply system includes a storage tank 6 storing a sealing compound. The tank 6 is connected to a plunger pump 1 as a supply device, which is a high pressure pump. The outlet port 1*a* of the pump 1 is connected to a number of supply lines S, one of which is shown, each connected to the inlet port 2*a* of a distant dispenser 2. The dispensers 2 of this system coat automotive components or works with a constant amount of the sealing compound.

Each supply line S is fitted with a pneumatically controlled flow regulating valve 3 as a pressure reducing valve, of which the pressure reduction ratio can be set. The supply line S consists of a primary supply line S1, which is high in pressure, on the upstream side of the pressure reducing valve 3 and a secondary supply line S2, which is low in pressure, on the downstream side of this valve 3. The pump 1 sucks the sealing compound from the tank 6, and supplies it under high pressure (about 15 MPa) to the primary supply lines S1 of the supply lines S. The secondary supply line S2 is fitted with an air-operated valve 4 as an on-off valve and a spring type accumulator 5, which is interposed between this valve 4 and the associated dispenser 2.

The dispenser 2 is fitted with a pressure sensor 9 near its inlet port 2*a*. The sensor 9 detects the pressure substantially at the port 2*a* and outputs a pressure signal to an electromagnetic valve 8 as a controller. The electromagnetic valve 8 controls the switching operation of the air-operated valve 4 depending on the pressure substantially at the dispenser port 2*a* so that the pressure can be kept within a preset range (for example, between 0.3 and 0.7 MPa). T he air-operated valve 4 is closed if the pressure detected by the sensor 9 is higher than the upper limit of the preset range. This valve 4 is opened if the pressure is lower than the lower limit of the range.

Figure 2:
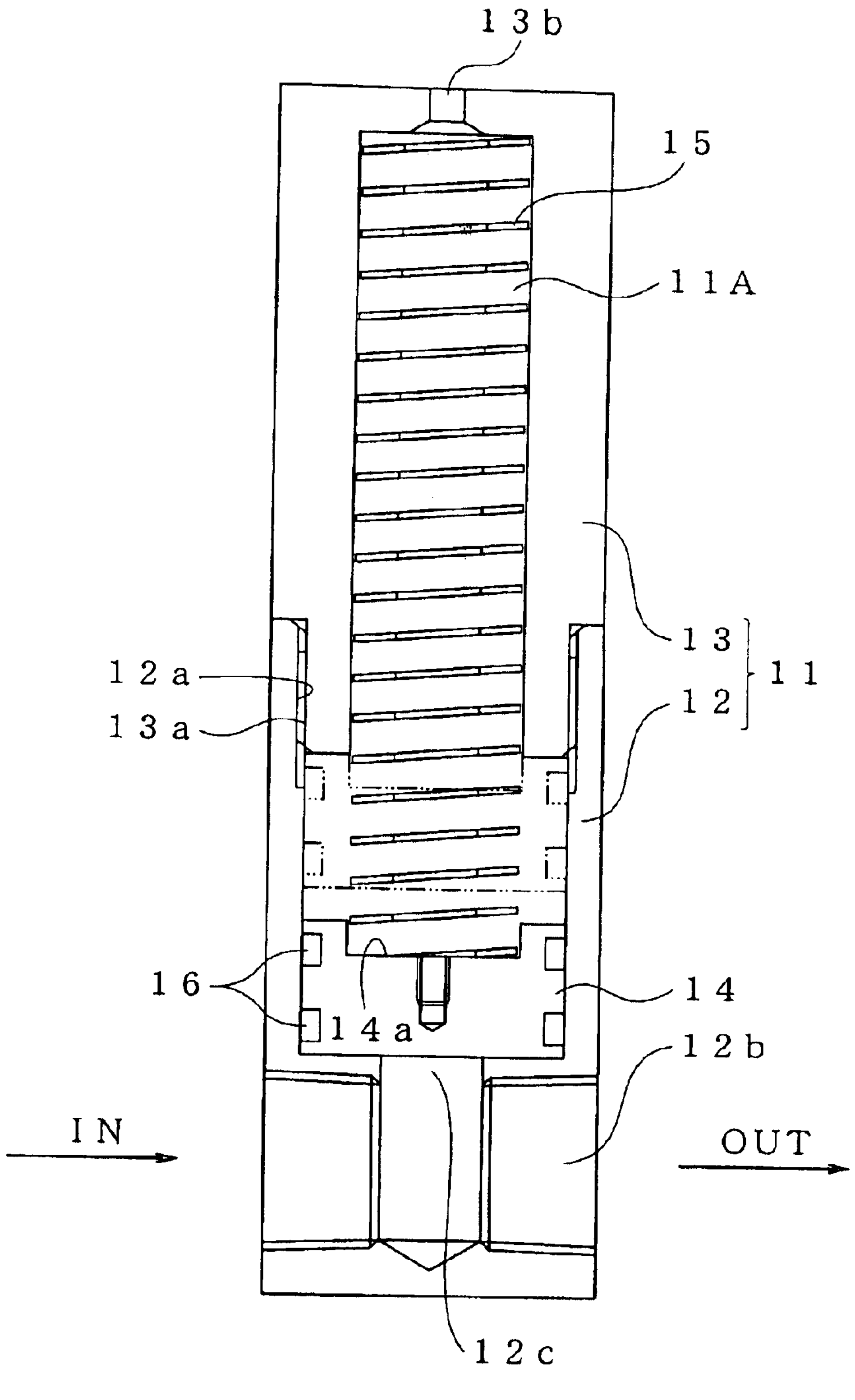
FIG. 2 is a cross section of the accumulator of the system shown in FIG. 1.

The accumulator 5 is a spring type accumulator, which does not need air piping or other control piping. The pressure in the accumulator 5 rises as the second chamber of this accumulator is filled. As shown in FIG. 2, the accumulator 5 includes a generally cylindrical casing 11, which consists of a lower casing 12 and an upper casing 13. A lower portion of the upper casing 13 has a male thread 13*a*. An upper portion of the lower casing 12 has a female thread 12*a*, which engages with the male thread 13*a*.

A piston 14 can slide in the accumulator casing 11, and defines the first chamber 11A and the second chamber on its upper and lower sides respectively in the casing 11. In FIG. 2, the volume of the second chamber is zero. The first chamber 11A functions as a spring chamber, which is fitted with a compression coil spring 15. The spring 15 biases the piston 14 downward. The spring 15 is substantially equal in diameter to the first chamber 11A. The top of the first chamber 11A has a hole 13*b* formed through it so that the pressure in this chamber is equal to the atmospheric pressure.

The lower casing 12 has a passage 12*b*, which is part of the secondary supply line S2, and another passage 12*c*, through which the passage 12*b* communicates with the second chamber of the accumulator 5. The peripheral surface of the piston 14 is fitted with sealing media 16 in contact with the casing 11. The top of the piston 14 has a spring seat 14*a*, in which the bottom of the spring 15 is seated.

The dispenser 2 is a small vertical single-shaft eccentric screw pump. As well known, a single-shaft eccentric screw pump includes an elastic stator, a metallic spiral rotor, a flexible connecting rod and a reversible servomotor, which is connected to an encoder. The stator has a spiral space that is elliptic in cross section. The spiral rotor is circular in cross section, and its pitch is half the pitch of the spiral space. The spiral rotor can rotate slidably in the spiral space. One end of the connecting rod is connected to one end of the spiral rotor eccentrically from the rotor. The other end of the connecting rod is connected to the driving shaft of the servomotor.

The liquid material supply system shown in FIG. 1 can be used as follows.

(1) The plunger pump 1 sucks the sealing compound from the storage tank 6. With the high pressure (15 MPa) sealing compound supplied to the supply line S, the pressure in the primary supply line S1 is kept high (15 MPa).

The flow regulating valve 3 restricts the flow of the sealing compound in the secondary supply line S2 so that the pressure in this line can be greatly reduced (4 MPa).

(2) If the supply of the sealing compound to the dispenser 2 tends to be short, it is preferable that the flow regulating valve 3 should adjust the pressure in the secondary supply line S2 so that the dispenser 2 can be sufficiently supplied.

(3) The dispenser 2 discharges a constant amount of the sealing compound onto a work in such a manner that the work can be coated at a constant width along the predetermined line on the work.

Figure 3:
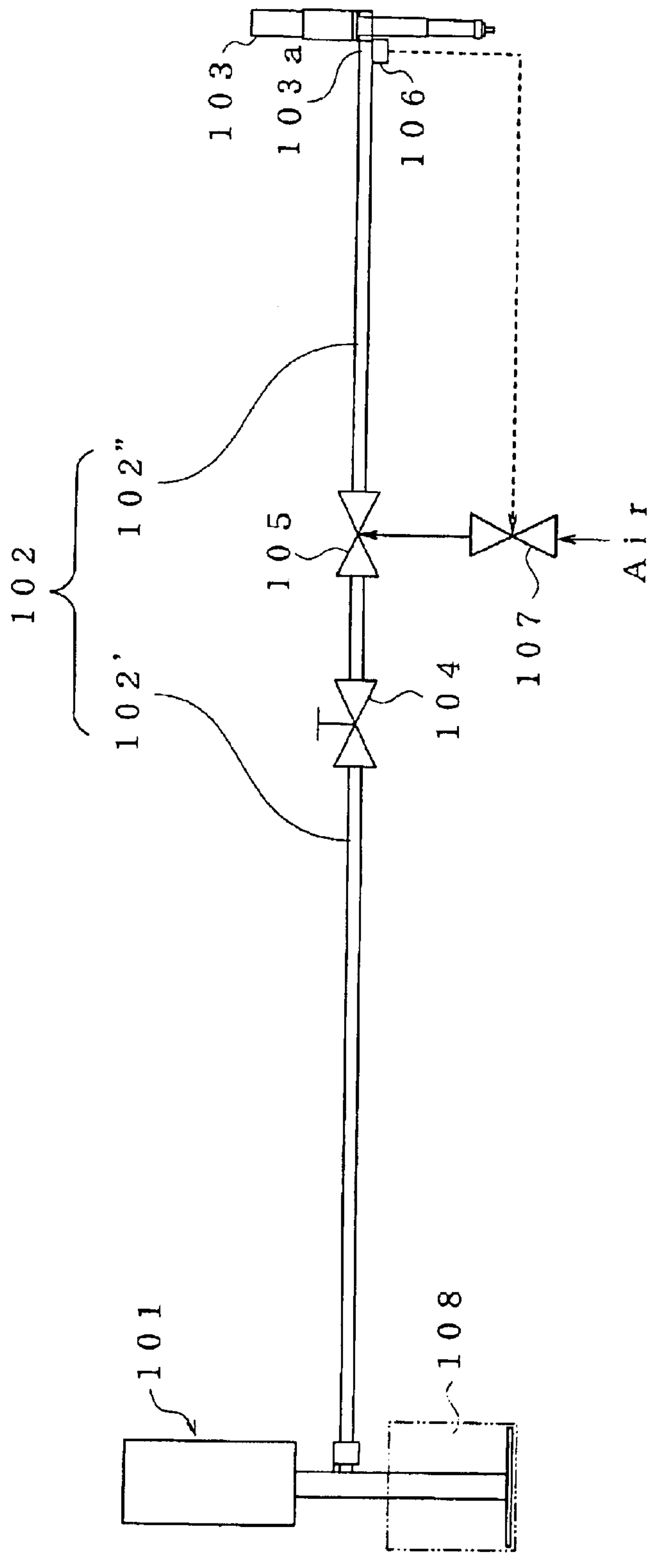
FIG. 3 is a schematic diagram of a conventional liquid material supply system.

(4) When the dispenser 2 finishes coating the work, the operation of the dispenser 2 is stopped. In the conventional liquid material supply system shown in FIG. 3, when the dispenser 103 stops, the pressure substantially at its inlet port 103*a* exceeds the set upper limit. This closes the air-operated valve 105. In the system shown in FIG. 1 and embodying the present invention, when the pressure in the secondary supply line S2 rises, part of the sealing compound in it is accumulated in the second chamber of the accumulator 5. This prevents the pressure from exceeding the set upper limit.

In the conventional liquid material supply system, when the dispenser 103 starts to operate, the pressure substantially at its inlet port 103*a* falls below the set lower limit. This opens the air-operated valve 105. In the system embodying the present invention, when the pressure in the secondary supply line S2 lowers, the sealing compound in the second chamber of the accumulator 5 is supplied to the secondary supply line S2. This prevents the pressure from falling below the lower limit.

The pressure reduction ratio of the flow regulating valve 3 may be so set that the pressure in the secondary supply line S2 is lower than for the full flow through it while the dispenser 2 is operating. In this case, the accumulator 5 prevents the pressure substantially at the dispenser inlet 2*a* (the pressure in the secondary supply line S2) from exceeding the set upper limit and falling below the set lower limit. Thus, the pressure substantially at the dispenser inlet 2*a* can be kept between the set limits. This greatly decreases the frequency at which the air-operated valve 4 opens and closes.

The plunger pump 1 might be connected to a single dispenser 2 by a single supply line S. In this case, if the setting of the discharge pressure of the pump 1 is changed, the supply line S may very likely need to be fitted with no flow regulating valve 3.

Although the accumulator 5 changes the material supply pressure, the dispenser 2, which is a single-shaft eccentric screw pump) can discharge a constant amount of the sealing compound.

(5) The dispenser 2 repeats a constant cycle of discharge and stopping. The dispenser 2 needs to be supplied with a sufficient amount of the sealing compound when it discharges after stopping. Any shortage of the supplied compound is compensated for by the sealing compound accumulated in the second chamber of the accumulator 5. Accordingly, the pressure in the secondary supply line S2 does not need to be kept as high as that for the conventional system shown in FIG. 3. This allows the flow regulating valve 3 to make a greater pressure reduction than for the conventional system so that the pressure in the secondary supply line S2 can be lower than that for the conventional system. Consequently, the pressure resistance of the parts on and for the secondary supply line S2 does not need to be as high as that for the conventional system. In this respect, the life of the air-operated valve 4 can be lengthened.

The liquid material supply system according to the present invention may alternatively be embodied as follows:

(i) The liquid material supply system may be a filling system for filling works with a constant amount of liquid material instead of coating them.

(ii) The accumulator may be an air pressure control type accumulator or another accumulator in which the pressure in the second chamber rises with liquid filled into the chamber.

(iii) The pressure reducing valve and the on-off valve may be electrically controlled.

What is claimed is:

1. A liquid material supply system comprising:

a supply device for sucking liquid material from a storage tank or another reservoir and supplying the sucked material under high pressure;

a pressure reducing valve having a pressure reduction ratio that can be set;

a primary supply line connecting the outlet port of the supply device to the pressure reducing valve;

a discharger for discharging a constant amount of liquid material to a work;

a secondary supply line connecting the pressure reducing valve to the inlet port of the discharger;

an on-off valve connected to the secondary supply line;

a controller connected to the on-off valve;

a pressure sensor for detecting the pressure substantially at the inlet port of the discharger and outputting a pressure signal to the controller so that the controller can close and open the on-off valve if the detected pressure exceeds a set upper limit and falls below a set lower limit, respectively; and an accumulator connected to the secondary supply line between the on-off valve and the inlet port of the discharger so as to prevent the pressure substantially at the inlet port from exceeding the upper limit and falling below the lower limit in a short time with the pressure reduction ratio so set that the pressure is lower than for the full flow through the secondary supply line while the discharger is operating.

* * * * *